United States Patent [19]
Klüting et al.

[11] Patent Number: 4,479,626
[45] Date of Patent: Oct. 30, 1984

[54] VEHICLE SEAT

[75] Inventors: Bernd Klüting, Radevormwald; Dieter Muhr, Remscheid, both of Fed. Rep. of Germany

[73] Assignee: Keiper Recaro GmbH & Co., Fed. Rep. of Germany

[21] Appl. No.: 397,198

[22] Filed: Jul. 12, 1982

[30] Foreign Application Priority Data

Jul. 23, 1981 [DE] Fed. Rep. of Germany ....... 3130444

[51] Int. Cl.³ .............................................. B60N 1/68
[52] U.S. Cl. .................................. 248/420; 248/393; 297/329; 297/261
[58] Field of Search ............... 248/371, 396, 393, 420, 248/429, 394, 395; 297/329, 317, 261, 270

[56] References Cited

U.S. PATENT DOCUMENTS

| 2,612,208 | 9/1952 | Rhodes | 248/420 |
| 2,864,431 | 12/1958 | Eaton | 248/393 |
| 3,437,302 | 4/1969 | Homier | 248/420 |
| 4,101,168 | 7/1978 | Ferro | 297/329 |

FOREIGN PATENT DOCUMENTS

| 105423 | 9/1899 | Fed. Rep. of Germany | 248/393 |
| 585196 | 1/1947 | United Kingdom | 249/393 |
| 2054731 | 2/1981 | United Kingdom | 248/371 |

*Primary Examiner*—Reinaldo P. Machado
*Assistant Examiner*—Alvin Chin-Shue
*Attorney, Agent, or Firm*—Wigman & Cohen

[57] ABSTRACT

A vehicle seat, the seat portion of which has an adjustable inclination, is supported on two concave guide rails (as viewed from the seat portion) which are supported by a seat frame and extend in the longitudinal direction of the seat portion so that the seat portion is longitudinally adjustable and can be locked in a selected position by means of a locking device. The locking device is arranged in the central section of the seat portion and includes a straight bar extending in the longitudinal direction of the seat portion. The ends of the bar are connected with the seat frame. This bar supports an adjusting member which can be adjusted steplessly in its longitudinal direction and can be secured in any position against a longitudinal movement. A coupling member is coupled with this adjusting member and is connected on its other end with the seat portion which is longitudinally adjustable on the guide rails.

9 Claims, 5 Drawing Figures

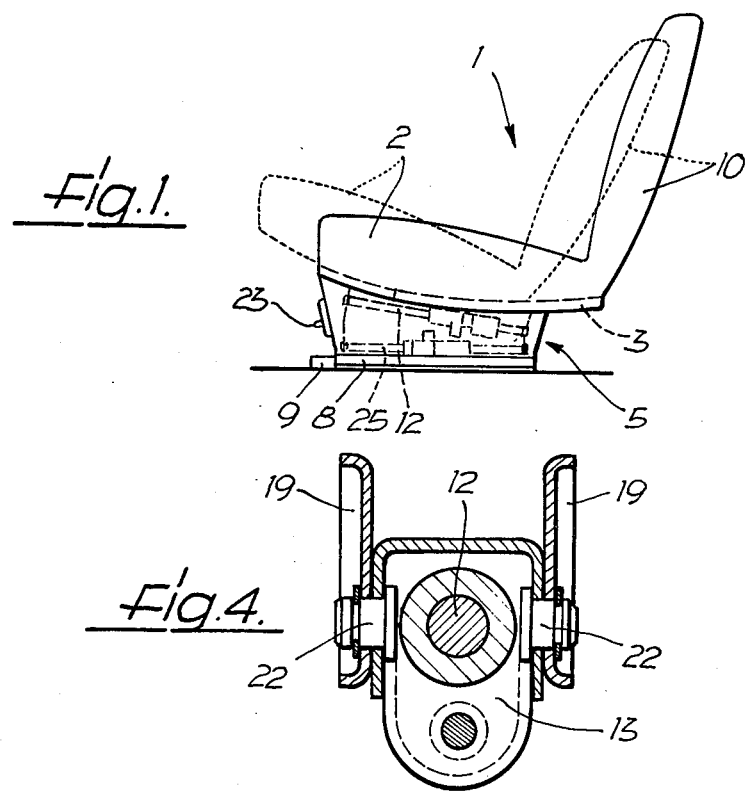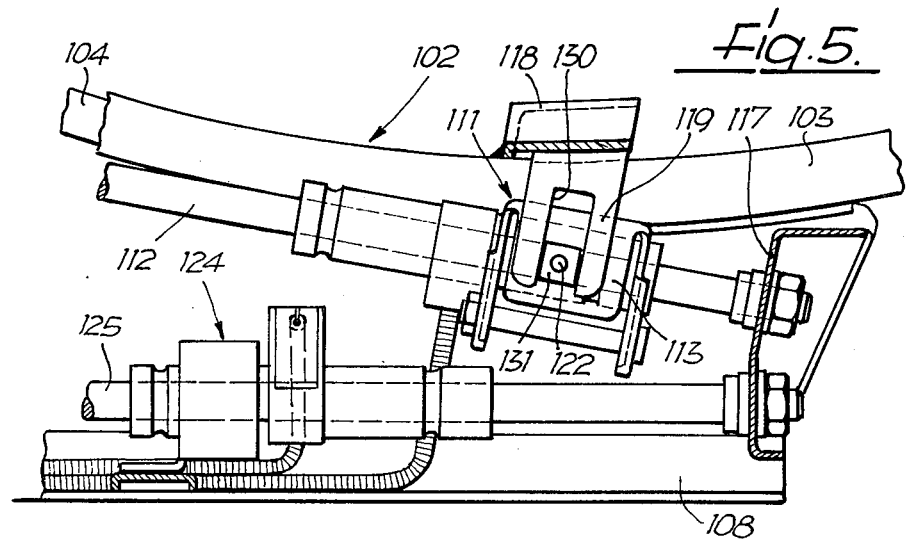

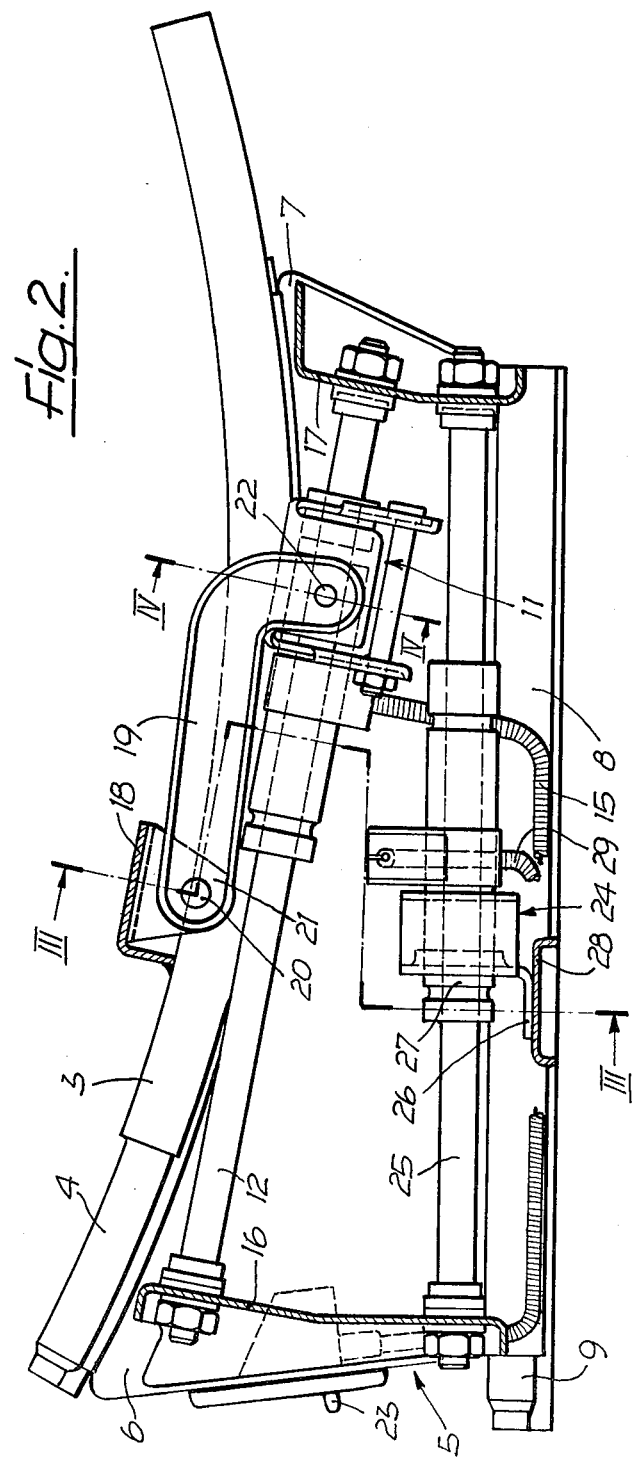

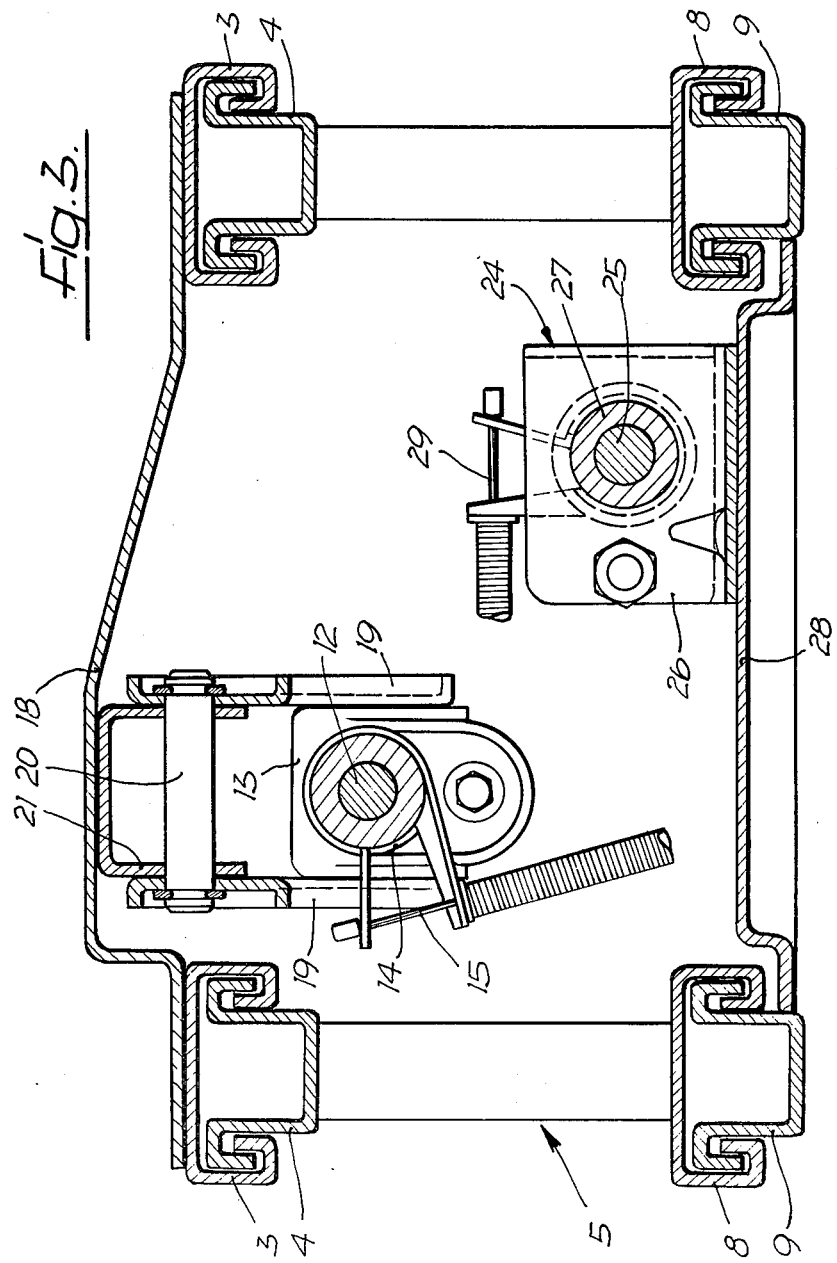

VEHICLE SEAT

BACKGROUND OF THE INVENTION

1. Field of the Invention

The invention relates to a vehicle seat. The seat portion has an adjustable inclination and is supported on two concave (as viewed from the seat portion) guide rails which are supported by a seat frame and extend in the longitudinal direction of the seat, so that the seat portion is longitudinally adjustable and can be locked in a selected position by means of a locking device.

2. Description of the Prior Art

In known vehicle seats of this type, which are used in motor vehicles, the curved guide rails are provided with recesses for the engagement of locking elements of the locking device. The result of this arrangement is not only that the inclination adjustment is possible only in steps, but also that the expense of manufacture for the guide rails is relatively large.

SUMMARY OF THE INVENTION

The object of the invention is to create a vehicle seat of the above-described type in which a stepless inclination adjustment of the seat portion is possible, but which is still not expensive.

The locking device according to the invention makes it possible, thanks to the adjusting member which can be moved steplessly along the bar and locked in any position, to have a stepless movement of the seat portion on the curved guide rails and thereby also have a stepless inclination adjustment. The coupling member, which connects the seat portion with the adjustment member, is able to compensate for different distances between the path of the seat portion defined by the guide rails and the path of the adjusting member defined by the bar, so that a disadvantageous straight line path of movement for the adjusting member does not appear. The bar, on which the adjusting member is arranged, can therefore be straight, which means lower manufacturing costs and above all also gives the possibility of providing a threaded spindle, which is particularly advantageous when the adjustment of the seat portion is to be performed with a motor.

The coupling member may be embodied in various ways. For example, it can be hinged to both the adjusting member and the seat portion. The connection via two hinges represents a design in which, with very simple means, a high load capacity and low wear of the connecting points can be achieved. To achieve a favorable transfer of force into the coupling member and the elements connected therewith, it is advantageous for the coupling member to have two spaced but adjacent arms, between which is located the adjusting member. However, the coupling member can also, for example, be rigidly connected with the seat portion. In order to make the necessary compensation possible, it is then pivotably connected with the adjusting member, in such a manner as to be capable of moving laterally to the longitudinal direction of the bar. This type of connection and, in addition, a favorable transfer of force are achieved, for example, when the coupling member has two straps, between which the adjusting member is located, which straps are each provided with a slot extending laterally to the longitudinal direction of the bar, in which slot a pin or a rotatably mounted sliding block engages.

In order to be able to keep the bridged distance between the path of the seat portion and the path of the adjusting member as small as possible with the aid of the coupling member, in a preferred exemplary embodiment, the longitudinal direction of the bar is at least approximately the same as the direction of the tangent to the curved guide rails in the center of the adjustment range of the seat portion on the guide rails.

In order to prevent a jamming of the seat portion in the guide rails despite the use of a single adjustment device, it is effective to connect the coupling member with a cross beam of the seat portion, which extends from one of the runner rails to the other, which runner rails are engaged with the guide rails.

To the extent that a manual inclination adjustment of the seat portion is provided, an adjustment member is sufficient which can be clamped to the bar by means of a releasable clamping device. If an inclination adjustment of the seat portion is to be possible by means of a manual or motor drive, then the bar can be formed as a rotatably mounted threaded spindle, the threading of which engages an internal threading of the adjusting member arranged on the threaded spindle. The threaded spindle and the adjusting member hereby form not only the locking device, because of their self-arresting characteristics, but also, thanks to the drive of the threaded spindle, an adjusting device.

BRIEF DESCRIPTION OF THE DRAWINGS

FIG. 1 is a schematically illustrated side view of a first exemplary embodiment in two different inclination positions, FIG. 2 is an enlarged side view of the seat frame and the elements of the first exemplary embodiment connected therewith, FIG. 3 is a section according to the line III—III in FIG. 2, FIG. 4 is a section along the line IV—IV in FIG. 2, and FIG. 5 is a view corresponding to FIG. 2 of a second exemplary embodiment.

DETAILED DESCRIPTION OF THE PREFERRED EMBODIMENTS

A seat portion 2 of a motor vehicle seat 1 has on its under side two adjacent, spaced runner rails 3 extending in the longitudinal direction of the seat 1 which, as viewed from the seat portion 2, are concave, comprising a section of a circular curve. In the exemplary embodiment, the distance between the two runner rails 3 is less than the width of the seat. Therefore, the sides of the seat portion 2 extend to the same degree over each of the runner rails 3.

The two runner rails 3 are longitudinally movable, guided in respective correspondingly curved guide rails 4, with which they are in form-fitting engagement, relative to a shifting laterally to the longitudinal rail axis, in the usual manner for vehicle seats. The two guide rails 4 are supported by a seat frame 5, the dimensions of which in the longitudinal direction of the seat 1 are smaller than those of the seat portion 2. The seat frame 5 has forward and rear supports 6 and 7, which support the guide rails 4, which are rigidly connected therewith. These guide rails 4, as shown in FIG. 2, are shorter than the guide rails 3 in order not to project beyond them. The lower ends of the supports 6 and 7 are rigidly connected with two straight slide rails 8 lying beneath the guide rails 4. The slide rails 8 are supported by seat rails 9 which are to be rigidly connected with the vehicle and allow a longitudinal adjustment of the vehicle seat 1. The slide rails 8 and the seat rails 9 are formed in the usual manner for vehicle seats.

The seat portion 2 is steplessly adjustable in the longitudinal direction of the guide rails 4 and thereby along a concave path, whereby its inclination position and that of a back rest 10 connected therewith are also steplessly variable. The back rest 10, however, also is connected with the seat portion 2 by means of a hinge fitting (not shown), so that its inclination position may be adjustable independently of that of the seat portion 2.

In order to be able to lock the seat portion 2 in any inclination position, a locking device 11 is provided which has a straight bar 12, on which is arranged an adjusting or locking member 13 which can be moved longitudinally without steps. Locking device 11 can be locked in any position and encompasses the bar 12. This locking member 13 supports a coil spring 14 which surrounds the bar 12 and then, when no release force is exerted on the coil spring 14, rigidly connects the locking member 13 with the bar 12. A longitudinal movement of the locking member 13 on the bar 12 is only possible when the coil spring 14 is first released. The coil spring 14 is released with the aid of a draw cable 15. As shown in FIG. 3, the cable engages a first arm, while the cable jacket is supported on a second arm. As these two arms projecting almost radially from the locking member 13 approach each other, the coil spring 14 is released from the bar 12. Since this locking device 11 is a known structural element, further explanation of its structural design is superfluous.

The front end of the bar 12 is rigidly connected with a front cross beam 16, and the rear end is rigidly connected with a rear cross beam 17. These two cross beams 16 and 17 extend between the two front supports 6 and the two rear supports 7 and are connected thereto. The positions of the points of attachment of the bar 12 to the two cross beams 16 and 17 are selected so that the bar 12 extends from the rear to the front cross beam 16 and thereby extends in a direction which is at least approximately tangential to the path of movement of the seat portion 2 defined by the guide rails 4 in the central section of this path. As shown in FIGS. 1 and 3, to save space, in the exemplary embodiment, the bar 12 is arranged somewhat laterally, next to the center of the seat portion 2.

The connection of the seat portion 2 with the locking member 13 takes place by means of a mechanical coupling formed by two L-shaped, spaced straps 19. In order for the straps 19 to have sufficient stiffness, which is particularly important under a compression load, the edges thereof are raised. The free end of the long shank of each of the two straps 19 is connected with a U-shaped strap 21 by means of a hinge bolt 20 extending in the longitudinal direction of the lateral cross support 18, i.e., in the lateral direction of the seat portion 2. The yoke portion of this U-shaped strap 21 is attached to the underside of the lateral cross support 18. The locking member 13 is located between the short shanks of the two straps 19, which extend rearwardly from the hinge bolt 20. This locking member 13 is provided with laterally projecting hinge pins 22, which hingedly connect the two straps 19 with the locking member 13, whereby this hinge axis lies parallel to the hinge bolt 20. As a result of these two hinge connections, the two straps 19 can compensate for the varying distances between the two paths defined by the guide rails 4 and the bar 12.

The draw cable 15 runs from the locking device 11 downward, where it is guided forward at the level of the slide rails 8 and ends at an activating member 23 attached to the front side of the front cross beam 16. This activating member 23 must be pulled upward by the seat user in order to release the locking device 11 for a shifting of the seat portion 2 in the guide rails 4. If the seat user then releases the activating member 23, the locking device 11 automatically returns to the locked condition.

In order to secure the vehicle seat 1 against a longitudinal shifting by moving along the seat rails 9 after a longitudinal adjustment, in the exemplary embodiment a second locking device 24 is provided which is formed like the locking device 11. As shown in FIG. 2, a second straight bar 25 is therefore connected with the two cross beams 16 and 17. Bar 25 lies parallel to the two slide rails 8. A connecting angle member 26 connects the locking member 27 of this second locking device with a lateral support 28 which is rigidly connected with the two seat rails 9. A draw cable 29, provided to release the coil spring of this second locking device 24, is guided to an activating member provided next to the activating member 23 on the front cross beam 16. This second activating member (not shown), like the activating member 23, is formed as a lateral grip molding which must be raised to release the locking device 11.

The second exemplary embodiment illustrated in FIG. 5 is distinguished from the first exemplary embodiment only by a different embodiment of the mechanical coupling between the locking member 113 and the seat portion 102. The explanation of this second exemplary embodiment is therefore limited to this difference. For other details the reader is referred to the statements made with regard to the first exemplary embodiment.

Two downwardly projecting straps 119 are attached to the lateral support 118 which extends in the lateral direction of the seat portion 102 from one runner rail 103 to the other. These straps 119 overlap the locking member 113 of the locking device 111 on both sides, so that, like the two straps 19 in the first exemplary embodiment, the locking member 113 is located between the two straps 119. Both straps 119 are provided with a longitudinally extending, downwardly open, straight slot 130, in which respective slide blocks 131 engage. The two slide blocks 131, which move without play in the longitudinal direction of the slots 130, are rotatably mounted on mounting pins 122 projecting laterally from the locking member 113. In this manner, like in the first exemplary embodiment, the different distances of the two mounting pins 122 from the runner rails 103 and also the differing angular positions of these pins 122 relative to the straps 119 in different positions of the locking member 113 can be compensated for.

In both exemplary embodiments, the bar 12 or 112 could be replaced by a threaded spindle rotatably mounted in the two cross beams 16 and 17 or 116 and 117, on which threaded spindle a threaded bushing sits, supporting laterally projecting pins which engage the straps 19 or 119. The self-arresting characteristics of the threading of such a threaded spindle would lead to the fact that a longitudinal adjustment of the threaded bushing could only take place by rotating the threaded spindle, for which purpose the threaded spindle would have to be driven by means of a hand wheel or a motor.

The foregoing two preferred embodiments are considered as illustrative only. Numerous other modifications and changes will readily occur to those skilled in the pertinent technology.

We claim:

1. Vehicle seat, the seat portion of which has an adjustable inclination, supported on concave guide rails which are further supported by a seat frame and extend in the longitudinal direction of the seat portion, comprising:
   means, arranged in a central section of the seat portion, for locking the seat portion in a selected position;
   a bar means of constant length for carrying the locking means, said bar means extending in the longitudinal direction of the seat portion, the ends of said bar means being connected with the seat frame;
   an adjusting member which can be moved steplessly in its longitudinal direction and which can be locked in any position against longitudinal movement, said adjusting member being supported by the bar means; and
   a coupling member, being pivotally connected to the adjusting member on one end and being pivotally connected on another end to a support member for the seat portion, said other end of the coupling member being longitudinally movable on the guide rails;
   whereby the seat portion is longitudinally adjustable.

2. Vehicle seat according to claim 1, characterized in that:
   said coupling member is connected by a hinge to the adjusting member and to the support member for the seat portion; and
   said hinge axes lie at a right angle to longitudinal axes of the guide rails and the bar means.

3. Vehicle seat according to claim 1, characterized in that:
   said coupling member includes two adjacent, spaced arms which can be loaded with one of compression and tension, between which arms the adjusting member is located.

4. Vehicle seat according to claim 1, characterized in that the longitudinal axis of the bar means is at least approximately parallel to the direction of a tangent to a curved path in a central section of the guide rails.

5. Vehicle seat according to claim 1, further comprising:
   runner rail means for engaging with the guide rails; and
   a cross beam means for extending beneath the seat portion;
   said cross beam means extending from one of the runner rail means to another runner rail means;
   said coupling member being connected beneath the cross beam means.

6. Vehicle seat according to claim 1, characterized in that:
   said adjusting member can be locked in place on the bar means by a releasable clamping device.

7. Vehicle seat according to claim 1, wherein said coupling member is connected to the adjusting member by a hinge.

8. Vehicle seat according to claim 1, wherein said locking means comprises a spring means releasably gripping said bar means.

9. Vehicle seat according to claim 8, wherein said spring means comprises a helical spring coiled around said bar means.

* * * * *